(12) United States Patent
Sugimoto et al.

(10) Patent No.: US 6,214,150 B1
(45) Date of Patent: Apr. 10, 2001

(54) METHOD OF TRANSFER PRINTING A CERAMIC SPARK PLUG INSULATOR

(75) Inventors: Makoto Sugimoto; Hirohito Ito, both of Nagoya (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 09/359,635

(22) Filed: Jul. 26, 1999

Related U.S. Application Data

(62) Division of application No. 08/842,708, filed on Apr. 17, 1997, now Pat. No. 5,976,674.

(30) Foreign Application Priority Data

Apr. 19, 1996 (JP) .......................................... 8-97873
Jul. 15, 1996 (JP) ................................... 8-184324
Jul. 15, 1996 (JP) ................................... 8-184350

(51) Int. Cl.[7] .............................. B44C 1/165; B41M 3/12; H01R 13/46; H01T 13/20; B41F 17/08
(52) U.S. Cl. ........................ 156/240; 156/230; 156/238; 156/241; 156/277; 427/146; 427/147; 428/195; 428/914; 430/199; 439/893; 101/33; 101/34; 101/38.1; 445/7

(58) Field of Search .................................. 156/230, 233, 156/236, 237, 238, 239, 240, 241, 247, 277, 289, 540, 542; 428/195, 914; 427/146, 147; 430/199, 202, 253, 254; 101/33, 34, 35, 36, 38.1; 439/893; 445/7

(56) References Cited

U.S. PATENT DOCUMENTS 3,907,974 * 9/1975 Smith ..................................... 428/346
4,640,188 * 2/1987 Cosson et al. ......................... 101/39

\* cited by examiner

*Primary Examiner*—Richard Crispino
*Assistant Examiner*—J. A. Lorengo
(74) *Attorney, Agent, or Firm*—Sughrue, Mion, Zinn, Macpeak & Seas, PLLC

(57) ABSTRACT

In a transfer sheet and a method of transferring a figuration to a ceramic product, an ink is provided by mixing a chromophoric pigment for expressing a desired coloration, a vitreous powder and thermoplastic resin. A sheet of paper or plastic film is prepared on which an appropriate figuration is screen printed with the use of the ink to transfer it to an outer surface of a ceramic product. A thermoplastic separable layer is provided between the mount sheet and a pigment layer. The pigment layer is coated with an adhesive layer.

7 Claims, 12 Drawing Sheets

METHOD OF TRANSFER PRINTING A CERAMIC SPARK PLUG INSULATOR

This is a divisional of application Ser. No. 08/842,708 filed Apr. 17, 1997, now U.S. Pat. No. 5,976,674, the disclosure of which is incorporated herein by reference.

BACKGROUND OF THE INVENTION

1. Field of the Invention

The invention relates to a transfer sheet and a method of transferring a figuration of a single or different colorations on a ceramic product from the transfer sheet. The ceramic product directs to a spark plug insulator, semiconductor base plate, rice bowl, dish plate, flower vase, pottery, toilet stool and the like, while the figuration concerns to a geometric figure, letter, numeral, ideogram, symbol, denotation, mark, pattern and the like.

2. Description of Prior Art

In a method in which a design pattern of a single or plurality of colorations is printed on a ceramic product, the following have been introduced.

(i) A transfer sheet is prepared on which a pigment layer is deposited to draw an appropriate design. The transfer sheet thus prepared is dipped into water to separate the pigment layer from the transfer sheet. After desiccating the pigment layer thus separated, the pigment layer is printed on a ceramic product at the time of sintering the ceramic product.

In this instance, it is supposed that this process invites cracks on the ceramic product after finishing the sintering procedure due to a residual aqueous component, and at the same time, inviting a degeneration in the design due to the heat provided during the sintering procedure, thus restricting the use practically to a tableware such as a rice bowl, tea bowl, dish plate and the like.

(ii) An ink is prepared with a chromophoric pigment while preparing a rubber stamp in which a merchandize mark is sculptured. After dipping the stamp into the ink, the stamp is pressed on an outer surface of a ceramic product (e.g., spark plug insulator) to impress the mark on it.

This process has advantages in that it generally invites no cracks on the ceramic product upon finishing the sintering procedure, and at the same time, inviting no adverse affect on the design due to the heat produced during the sintering procedure.

However, the process has drawbacks in that it is physically difficult to produce the design of different colorations in addition to the merchandize mark being blurred.

OBJECTS OF THE INVENTION

In order to obviate the drawbacks, the present invention is made with the inventor's concept as mentioned below in mind.

As shown in FIG. 10, pigment layers 102, 103 are screen printed on a mount sheet 101 to provide a transfer sheet 100 on which an appropriate design is made.

The transfer sheet 100 enables to clearly imprint the design of different colorations on the outer surface of the ceramic product in the following manner.

Firstly, the transfer sheet 100 is tightly pressed on the heated ceramic product. While pressing the transfer sheet 100 on the product, the pigment layers 102, 103 are thermally melt to transfer them to the ceramic product from the sheet 100. The ceramic product is sintered at a temperature of over 600° C. to thermally imprint the pigment layers 102, 103 on the ceramic product.

However, the pigment layers 102, 103 may partly remain on the mount sheet 101 to invite an insufficient transfer with the pigment layers 102, 103 unfavorably blotted due to a poor separability between the mount sheet 101 and the pigment layers 102, 103. This is all the more true when the transfer temperature falls outside of an optimal temperature range.

In order to facilitate the separation, it is supposed to conceptually provide a separable layer 101A between the mount sheet 101 and the pigment layers 102, 103 as shown in FIG. 11.

However, an undulating surface of the ceramic product defoliates a part of the pigment layers 102, 103 to result in transfer defections during transferring procedure generally at the rate of about ten out of one hundred products.

In order to eliminate the transfer defections, it is suggested to minutely grind the outer surface of the ceramic product, otherwise smoothing it by applying an enamel over it. It is, however, costly to treat additionally with the time-consuming procedures.

In each of the above transfer processes, it often occurs that the pigment layers fail to completely adhere to the outer surface of the ceramic product. This is especially the case with an outer periphery of the pigment layers.

Therefore, it is a first object of the invention to provide a transfer sheet which is capable of positively transferring a figuration of different colorations to an outer surface of the ceramic product.

In this instance, the figuration concerns to a geometric figure, letter, numeral, ideogram, symbol, denotation, mark, pattern and the like, and any ceramic product can be used herein whether it is in the form of revolving body or flat body.

It is a second object of the invention to provide a method of transferring a figuration which is capable of positively transferring the figuration of different colorations to an outer surface of the ceramic product.

It is a third object of the invention to provide a transfer film which is capable of positively transferring a figuration of different colorations to an outer surface of the ceramic product.

It is a fourth object of the invention to provide a transfer sheet which is capable of positively transferring a figuration of different colorations to an outer surface of the ceramic product within a wide range of transfer temperature when the transfer sheet is pressed on the ceramic product to transfer the figuration to it.

It is a fifth object of the invention to provide a transfer sheet which is capable of positively transferring a figuration of different colorations to the ceramic product with no defection without grinding it or smoothing it by applying an enamel layer thereon.

It is a sixth object of the invention to provide a transfer sheet which is capable of positively transferring a figuration of different colorations to an outer surface of the ceramic product without remaining an outer periphery of the pigment layer on the transfer sheet upon separating the mount sheet from the pigment

SUMMARY OF THE INVENTION

According to the present invention, an ink is provided by mixing a chromophoric pigment for expressing one coloration, a vitreous powder and thermoplastic resin. An appropriate figuration is screen printed on a sheet of paper or plastic film to form a pigment layer by using the ink. Then, a discrete chromophoric pigment is printed on the same sheet to form another pigment layer. The same procedures are repeated to provide a transfer sheet on which several pigment layers are deposited.

With the use of the transfer sheet, it is possible to definitively transfer a figuration of different colorations to an outer surface of a ceramic product.

According to another aspect of the present invention, the transfer sheet is tightly pressed on the outer surface of the ceramic product to transfer the figuration thereto while a ceramic product is heated at a first temperature, the figuration from the transfer sheet is printed on the ceramic product at a second temperature.

With the use of the transfer sheet, it is possible to positively transfer a figuration of different colorations on the outer surface of the ceramic product.

According to other aspect of the present invention, when the ceramic product is in the form of revolving body, it is possible to readily transfer the figuration of different colorations to the ceramic product while revolving the ceramic product around its central axis.

According to other aspect of the present invention, the ceramic product is sintered at 600° C. or more so as to concurrently print the figuration ink on the product after the transfer sheet is pressed on the ceramic product while heating the ceramic product to 60~150° C. It is possible to positively and definitively transfer a figuration of different colorations to the outer surface of the ceramic product.

It is to be observed that when the heating temperature of the ceramic product is short of 60° C., the thermoplastic material is not satisfactorily thermoplasticized, thus failing to fully transfer the figuration to leave the possibility that figuration ink might fall off easily. When the temperature to heat the ceramic product exceeds 150° C., an organic ingredient of the figuration ink begins to melt or decompose, thus making it difficult to normally transfer the figuration ink thereto. When the printing temperature is short of 600° C., the thermoplastic ingredient partly remains on the product so as to blot its appearance.

According to other aspect of the present invention, it enables to definitively print on the ceramic product by different colorations, thus bettering its appearance to attract consumers. It is noted that the transfer procedure has no significant affect on a good performance which the ceramic product originally has attained.

According to other aspect of the present invention, a separable layer is prepared with a thermoplastic material as a main constituent so as to be formed on the mount sheet. One or several pigment layers are deposited on the separable layer alone, isolated or in overlapped relationship. In this instance, the separable layer thermoplasticizes at a temperature lower than a temperature the pigment layer does.

By pressing the transfer sheet on the ceramic product at a transfer temperature, the softened separable layer makes the thermoplastic ingredient rich in fluidity to reduce a bondage strength between the mount sheet and the separable layer, thus making it possible to readily transfer the pigment layer to the ceramic product. By heating the ceramic product to a printing temperature, it is possible to definitively imprint the pigment layer on the outer surface of the ceramic product.

From the reason that the separable layer facilitates to separate the pigment layer from the mount sheet, it is possible to positively transfer the design layer with no significant defection within a wide range of the transfer temperature.

According to other aspect of the present invention, the separable layer is prepared with a thermoplastic material as a main constituent so as to be formed on the mount sheet. The separable layer thermoplasticizes at a temperature lower than a temperature the pigment layer does. Each of the pigment layers places its lower surface on the separable layer, or placing the lower surface on a lower one of the pigment layers.

By pressing the transfer sheet on the ceramic product within the range of the first predetermined temperature, the softened separable layer makes the thermoplastic ingredient rich in fluidity to reduce a bondage strength between the mount sheet and the separable layer, thus making it possible to readily transfer the pigment layer to the ceramic product. By heating the ceramic product within the range of a second predetermined temperature, it is possible to definitively print the pigment layer on the outer surface of the ceramic product.

According to other aspect of the present invention, the design layer is a figuration screen printed on a transfer sheet by an ink mixed with the chromophoric pigment, a vitreous powder and thermoplastic resin, and the pigment layer thermoplasticizes at a temperature higher than the separable layer does.

By pressing the transfer sheet on the ceramic product within the range of the first transfer temperature, the softened separable layer makes the thermoplastic ingredient rich in fluidity to reduce the bondage strength between the mount sheet and the separable layer, thus making it possible to readily transfer the pigment layer to the ceramic product.

By heating the ceramic product within the range of a second printing temperature, it enables to definitively print the pigment layer by different colorations on the outer surface of the ceramic product.

According to other aspect of the present invention, one or several pigment layers are deposited on the mount sheet alone, isolated or in overlapped relationship. An adhesive layer is prepared by a thermoplastic material to coat the pigment layer so as to form a transfer sheet.

The transfer sheet is pressed on the outer surface of the ceramic product via the adhesive layer. With the pigment layer reinforced by the thermoplastic adhesive layer, the pigment layer is favorably transferred to the outer surface of the ceramic product without defection in the presence of undulated outer surface of the ceramic product. After separating the mount sheet from the transfer sheet, the pigment layer is printed on the ceramic product at the time of sintering it.

According to other aspect of the present invention, one or several pigment layers are deposited on the mount sheet alone, isolated or in overlapped relationship. The pigment layers are coated with a thermoplastic adhesive layer to form a transfer sheet.

The transfer sheet is pressed on the outer surface of the ceramic product via the adhesive layer. The transfer temperature causes to reduces the bondage strength between the mount sheet and the pigment layer. With the pigment layer reinforced by the thermoplastic adhesive layer, the pigment layer is favorably adhered to the outer surface of the ceramic product without defections in the presence of undulated outer surface of the ceramic product. After separating the mount sheet from the transfer sheet, the pigment layer is positively printed on the ceramic product at the printing temperature.

According to other aspect of the present invention, a thermoplastic separable layer is provided on the mount sheet. Preferably, the separable layer thermoplasticizes at a temperature lower than the pigment layer.

One or several pigment layers are deposited on the separable layer alone, isolated or in overlapped relationship. The pigment layers are coated with the thermoplastic adhesive layer to form a transfer sheet.

The transfer sheet is pressed on the outer surface of the ceramic product via the adhesive layer. The transfer temperature causes to facilitate fluidity of the thermoplastic separable layer so as to reduce the bondage strength between the mount sheet and the separable layer. This makes it possible to readily stick the adhesive layer to the outer surface of the ceramic product to transfer the pigment layer to it by separating the mount sheet from the separable layer.

With the pigment layer reinforced by the thermoplastic adhesive layer, the pigment layer is favorably transferred to the outer surface of the ceramic product without defection in the presence of undulated outer surface of the ceramic product.

With the separable layer facilitating separation of the pigment layer from the mount sheet, it is possible to positively transfer the pigment layer to the ceramic product within a wide range of transfer temperature. After separating the mount sheet from the transfer sheet, the pigment layer is positively and definitively transferred to the ceramic product.

According to other aspect of the present invention, it is possible to represent the pigment layer by a desired coloration at the printing temperature since the pigment layer is prepared with a chromophoric pigment made of metal or metallic compound. By selecting types of the chromophoric pigment, it is possible to express figuration design by one or different colorations.

According to other aspect of the present invention, it is possible to represent the ceramic product by a spark plug insulator, semiconductor base plate, rice bowl, dish plate, flower vase, pottery and toilet stool, while representing the pigment layer by a geometric figure, letter, numeral, ideogram, symbol, denotation, mark and pattern.

According to other aspect of the present invention, one or several pigment layers are deposited on the separable layer alone, isolated or in overlapped relationship without protruding out of an area of the separable layer. An adhesive layer is deposited to coat an entire area of the pigment layer without protruding out of an area of the separable layer.

The transfer sheet is pressed on the outer surface of the ceramic product at a temperature which enables to render the separable layer rich in fluidity, thus reducing the bondage strength between the mount sheet and the separable layer. By separating the mount sheet, it is possible to transfer the pigment and separable layers to the ceramic product without defection. At the printing temperature, it enables to positively and definitively print the pigment layer on the ceramic product.

Among the layers, each area of these layers is represented by separable layer≧adhesive layer≧pigment layer. Namely, the adhesive layer resides within the separable layer, and the pigment layer resides within the adhesive layer.

This makes it possible to positively separate the pigment layer and the adhesive layer from the mount sheet to adhere them to the ceramic product without residing a part of the pigment layer on the mount sheet when separating the mount sheet from the pigment layer. This leads to positively transferring the pigment layer to the ceramic product so as to avoid the transfer defections.

According to other aspect of the present invention, the separable layer thermoplasticizes at a temperature lower than a temperature the adhesive layer and the pigment layer do respectively. When the transfer sheet is pressed on the ceramic product at a temperature which renders the separable layer rich in fluidity, the separable layer begins to thermoplasticize to reduce the bondage strength between the mount sheet and the separable layer, thus positively adhering the pigment layer and the adhesive layer to the ceramic product without defection when separating the mount sheet off the transfer sheet.

According to other aspect of the present invention, the transfer sheet is pressed on the ceramic product of revolving body at the transfer temperature in which the separable layer is softened enough to print the pigment layer while revolving the ceramic product around its central axis.

At the transfer temperature, it enables to thermoplasticize the separable layer so as to reduce the bondage strength between the mount sheet and the separable layer, thus positively adhering the pigment layer and the adhesive layer to the ceramic product respectively without the defections upon separating the mount sheet from the transfer sheet. Then, the pigment layer is positively and definitively printed on the ceramic product when the ceramic product is heated to the printing temperature.

DETAILED DESCRIPTION OF PREFERRED EMBODIMENTS OF THE INVENTION

Figure 1:
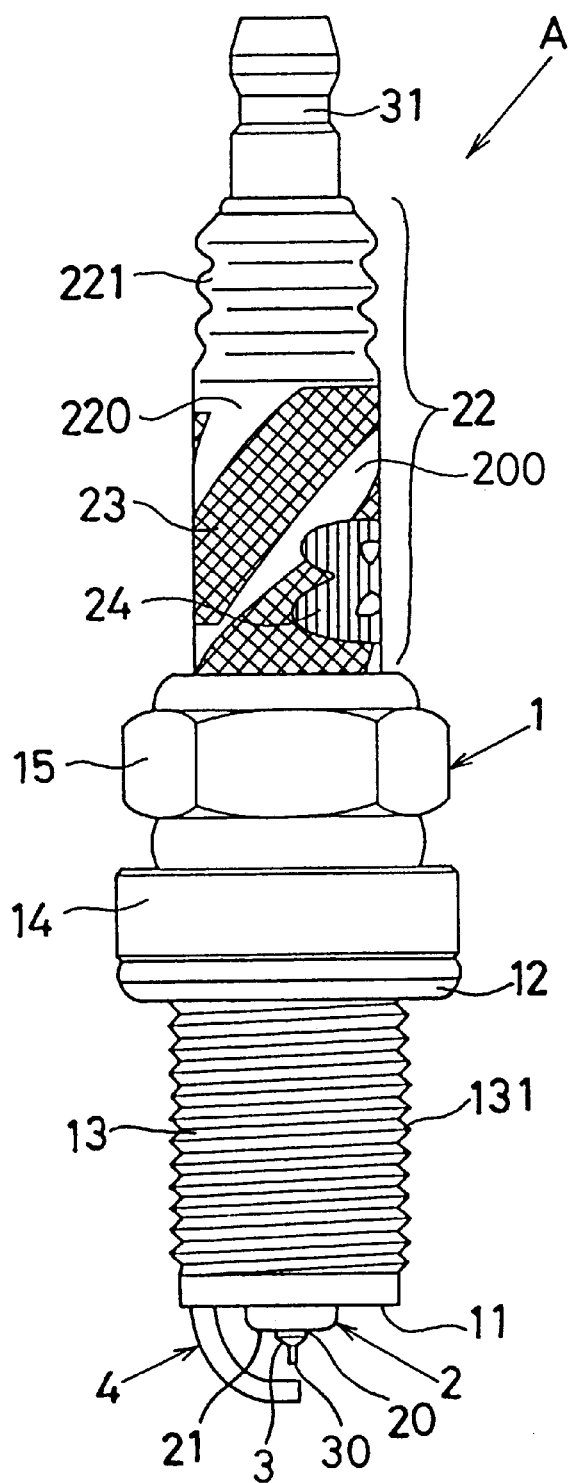
FIG. 1 is an elevational view of a design layer transferred to a spark plug insulator according to a first embodiment of the invention.

Referring to FIG. 1 in which a design layer transferred to a spark plug (A) according to a first embodiment of the invention. The spark plug (A) has a cylindrical metal shell 1 in which an insulator 2 is firmly placed whose inner space serves as an axial bore 20. Within the axial bore 20, a center electrode 3 is placed to extends its front end beyond an insulator nose 21. To a front end 11 of the metal shell 1, an L-shaped ground electrode 4 is resistance welded so that its front firing end faces a front end of the center electrode 3.

The metal shell 1 is made of low carbon steel, and having an outer surface 131 provided with a male thread 13, a hexagon 15 and a barrel portion 14 around which a gasket 12 is provided. By applying a wrench to the hexagon 15, the metal shell 1 is to be mounted on a screw hole which is provided with a cylinder head of an internal combustion engine (each not shown) by way of the gasket 12.

The insulator 2 is made of a sintered ceramic body with alumina as a main constituent. The insulator 2 has the insulator nose 21 surrounded by a portion in which the male thread 13 is provided. The insulator 2 further has a head column 22 provided with a corrugation 221, and having a diameter-increased portion located inside the hexagon 15 and the barrel portion 14.

The center electrode 3 is made of a nickel based alloy in which a copper core is embedded. A front tip 30 of the center electrode 3, which is thinned as small as 0.6 mm in diameter, has a noble metal such as an iridium based alloy, platinum-iridium based alloy or the like.

On outer surface 200 of the head column 22 of the insulator 2 except for a portion in which the corrugation 221 is provided, a yellow ribbon and red colored numeral are to be printed as transfer marks as designated at 23, 24.

With reference to Table 1, a method of transferring these transfer marks is as follows:

TABLE 1

| transfer mark | red | yellow |
| --- | --- | --- |
| constituents of pigment | CdS 80 wt % Se 20 wt % | $Pb_3O_4$ 60 wt % $Sb_2O_5$ 40 wt % |
| constituents of vitreous material and pigment | $PbO\text{-}SiO_2$ 88 wt % pigment 12 wt % | $PbO\text{-}SiO_2$ 85 wt % pigment 15 wt % |

(1) The pigment powder and $PbO\text{-}SiO_2$ based glass are mixed to form a mixture as shown at Table 1. An average grain diameter of the pigment powder is 1.5 μm in each of the constituents. To a 50 volume part of the mixture thus treated, a 50 volume part of acrylic solution and a 50 volume part of α-terpinol are added to mix and knead them to provide a transfer ink (red and yellow). An addition of α-terpinol is adjusted with its viscosity into consideration since it affects on workability in a subsequent printing step.

The constituents of the $PbO\text{-}SiO_2$ glass are PbO (41 wt %), $SiO_2$ (35 wt %), $B_2O_3$ (15.5 wt %), CaO (3.0 wt %), $K_2O$ (1.5 wt %), $Na_2O$ (1.0 wt %), MgO (1.0 wt %) and $Al_2O_3$ (2.0 wt %). An average grain diameter of the $PbO\text{-}SiO_2$ glass powder is 1.7 μm in each of the constituents.

(2) Upon preparing the transfer marks, the red transfer ink is deposited on a polyester film by a screen printing method to form a pigment layer for expressing the red colored numeral 24. Then, the red colored numeral 24 is desiccated at 120° C. for approx. for 20 minutes. On the same polyester film, the yellow transfer ink is deposited by the screen printing method to form another pigment layer for expressing the yellow ribbon 23 in the manner to partly overlap the red colored numeral 24. Then, the yellow ribbon 24 is desiccated at 120° C. for approx. for 20 minutes to form a transfer sheet 49.

Figure 1A:
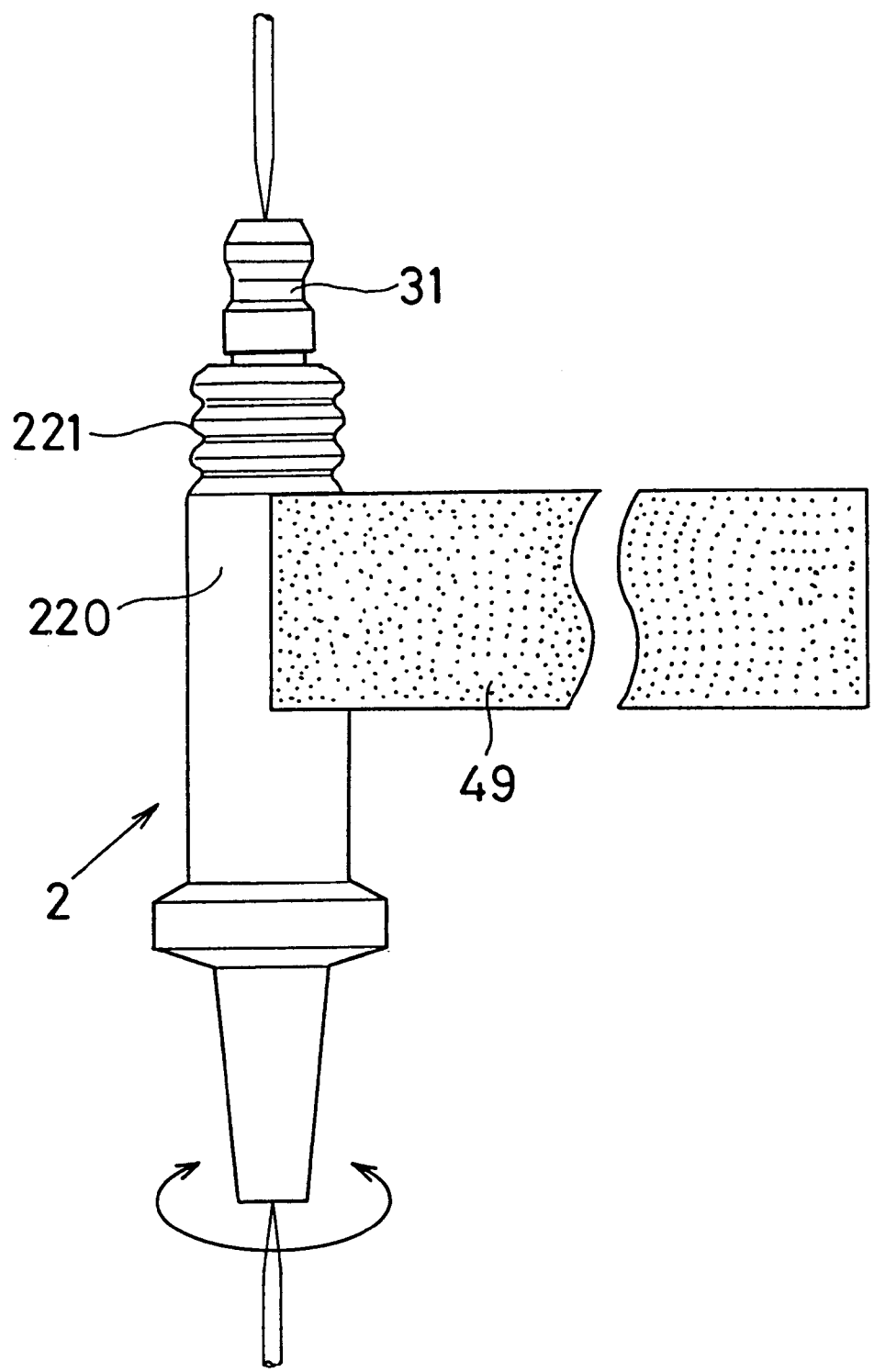
FIG. 1a is a schematic view of the spark plug insulator on which a transfer sheet is pressed while revolving the insulator.

(3) Upon transferring these transfer marks, as shown in FIG. 1a, the transfer sheet 49 is pressed on an outer surface 200 of the insulator 2 which is heated at approx. 80° C. in advance while revolving the insulator 2 around its central axis.

(4) Finally, the transfer marks on the insulator 2 are heated to approx. 850° C. to print both the ribbon 23 and numeral 24 on the outer surface 200 of the insulator 2.

It is to be observed that after inserting the center electrode 3 into the axial bore 20 of the insulator 2 on which the transfer marks are printed, a first glassy powder, a resistor element and a second glassy powder (each not shown) are in turn supplied into a rear end of the axial bore 20 of the insulator 2. While heating the insulator 2 at 900° C. for 15 minutes, a terminal electrode 31 is forced into the axial bore 20 to be vitreously sealed with the center electrode 3. Subsequent to the process, a rear end of the metal shell 1 is caulked against a shoulder portion which is defined on the insulator 2 so as to complete an assemble of the spark plug (A).

According to the embodiment of the invention, the yellow ribbon 23 and the red colored numeral 24 are definitively printed on the outer surface 200 of the insulator 2 without inviting blots thereon. This improves an appearance of the insulator 2 to attract customers to stimulate their purchasing incentive when displaying the spark plug (A) in a dealer's shop. It is found that printing the transfer marks on the insulator 2 has no significant affect on a good performance that the insulator 2 originally has attained.

As described above, the transfer sheet 49 is pressed on the insulator 2 at approx. 80° C. while revolving the insulator 2 around its central axis. Then, the insulator 2 is heated to approx. 850° C. to print the ribbon 23 and numeral 24 on the outer surface 200 of the insulator 2.

This makes it possible to simultaneously print the ribbon 23 and the numeral 24 by different colorations on the insulator 2 so as to complete the transfer procedure quickly with a minimum possible cost.

It is to be noted that since the thermoplastic material is fully thermoplasticized when heating the insulator 2 is 80° C., it is possible to satisfactorily transfer the marks at the time of pressing them on the insulator 2. Additionally, considering that the insulator 2 is generally free from thermoplastic residue at 850° C., it is possible to definitively print the yelow ribbon 23 and the red colored numeral 24 on the insulator 2 without inviting blots thereon.

Figure 2:
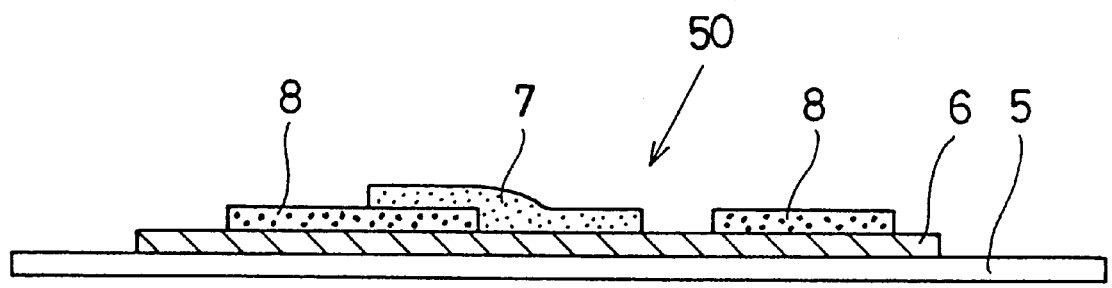
FIG. 2 is a longitudinal cross sectional view of a transfer sheet according to a second embodiment of the invention.

FIG. 2 shows a second embodiment of the invention in which new reference numerals are add to part components other than the part components designated by the respective reference numerals identical to those in FIG. 1.

With reference to Table 2, a method of transferring the transfer marks is as follows:

(1) On a high quality paper (mount sheet) 5 whose surface is smoothed by talc and/or smectite, a separable layer 6 is screen printed which is prepared with acrylic material as a main constituent. The paper 5 is desiccate in a dry chamber at 130° C. for about 30 minutes. The acrylic separable layer 6 is thermoplasticized at a temperature lower than a temperature pigment layers 7, 8 do respectively as described hereinafter.

The paper 5, which measures 0.2 mm in thickness, has a width dimension equivalent to a equi-diameter section 220 of the head column 22 of the insulator 2, and having a length longer than a circumferential dimension of the equi-diameter section 220. An area of the separable layer 6 is greater than that of the yellow ribbon 23 and the red colored numeral 24.

(2) On the separable layer 6 of the paper 5, the pigment layer 8 is screen printed with the use of the red transfer ink for expressing the red colored numeral 24. After printing the pigment layer 8, the paper 5 and the layer 8 are desiccated in the dry chamber at 130° C. for about 30 minutes.

(3) After desiccating them, another pigment layer 7 is screen printed on the paper 5 to partly overlap the pigment layer 8 with the use of the yellow transfer ink for expressing the yellow ribbon 23. Then, the paper 5 thus treated is desiccated again in the dry chamber at 130° C. for about 30 minutes so as to provide a transfer sheet 50.

In this occasion, it is necessary to place a lower surface of the pigment layer 7 directly on the separable layer 6, and partly placing it on the pigment layer 8.

It is to be observed that the transfer inks (red, yellow) are prepared by mixing red and yellow pigment with PbO—$SiO_2$ based glass to form a mixture as shown at Table 2. An average grain diameter of the pigment powder is 1.0 μm in each of the constituents. To a 70 volume part of the mixture thus treated, a 60 volume part of acrylic solution and a 70 volume part of α-terpinol are added to mix and knead them to provide the transfer inks (red and yellow). It is to be noted that the PbO—$SiO_2$ based glass contains 30% PbO by weight, and its grain diameter is 1.2μ on average.

TABLE 2

| transfer mark | red | yellow |
|---|---|---|
| constituents of pigment | CdS 80 wt % Se 20 wt % | $Pb_3O_4$ 60 wt % $Sb_2O_5$ 40 wt % |
| constituents of vitreous material and pigment | PbO-$SiO_2$ 70 wt % pigment 30 wt % | PbO-$SiO_2$ 70 wt % pigment 30 wt % |

(4) Upon transferring the marks from the transfer sheet 50, the insulator 2 is heated in the range of a first predetermined temperature (65~85° C., preferably 70~80° C.) Then, the transfer sheet 50 is pressed on the outer surface 200 of the insulator 2 while revolving the insulator 2 around its central axis. In this instance, the transfer sheet 50 may be heated in the range of the first predetermined temperature instead of the insulator 2.

When pressing the transfer sheet 50 on the insulator 2, the insulator 2 gives its heat to the thermoplastic separable layer 6 to soften it, thus reducing a bondage strength between the paper 5 and the separable layer 6. This makes it possible to readily separate the paper 5 from the separable layer 6 so as to transfer the pigment layers 7, 8 to the outer surface 200 of the insulator 2.

(5) The insulator 2, to which the transfer marks are adhered, is heated to approx. 850° C. for 30 minutes so as to print the yellow ribbon 23 and red colored numeral 24 on the insulator 2.

In this instance, the printing temperature may be in the range of 750~850° C. At the time of heating the insulator 2, the thermoplastic separable layer 6 disappears by evaporation.

It is to be observed that after inserting the center electrode 3 into the axial bore 20 of the insulator 2 on which the transfer marks are printed, in order to complete the assemble of the spark plug, the same procedures are repeated as those described in the first embodiment of the invention.

With the separable layer 6 provided between the paper 5 and the pigment layers 7, 8, it is possible to easily separate the paper 5 from the transfer sheet 50. In order to show a good separability of the paper 5, a tansfer experimental test was carried out to compare the transfer sheet 50 with a modified transfer sheet in which pigment layers are directly placed on the paper 5. Upon carrying out the tansfer experimental test, the insulator 2 is heated in the range of 60~90° C. The transfer experimental test result is shown in Table 3.

TABLE 3

| temperature | 60° C. | 70° C. | 80° C. | 90° C. |
|---|---|---|---|---|
| transfer sheet 50 | Δ | ○ | ○ | ΔΔ |
| modified transfer sheet | X | Δ | ○ | ΔΔ |

(*)Note
X represents a total inability of transfer,
Δ represents a partly inability of transfer,
ΔΔ represents a transfer with blots, ○ represents a good transfer with an acceptable definitiveness.

Table 3 shows that the transfer defections occur due to temperature variations in the modified transfer sheet because the transferable temperature range of 75~85° C. (around 80° C.) is limited. As the case with the transfer sheet 50, it is possible to positively transfer the pigment layers 7, 8 in the wide range of 65~85° C. (preferably 70~80° C.) with no significant defections.

Figure 3:
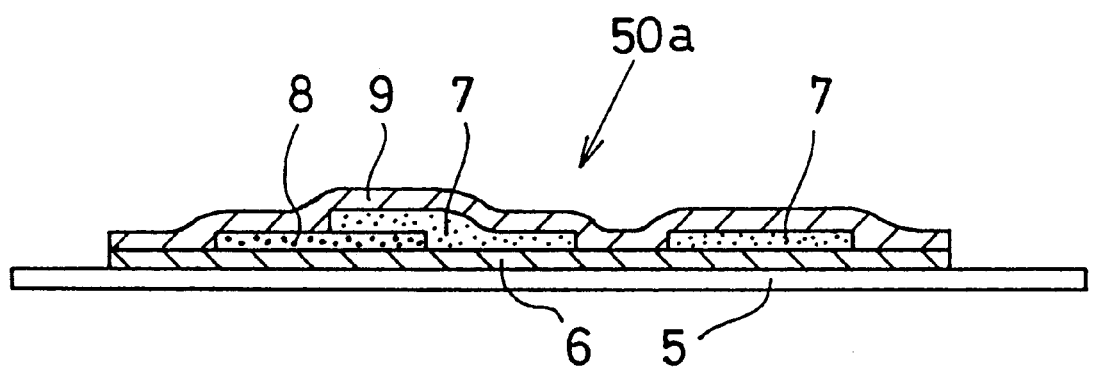
FIG. 3 is a longitudinal cross sectional view of a transfer sheet according to a third embodiment of the invention.
Figure 4:
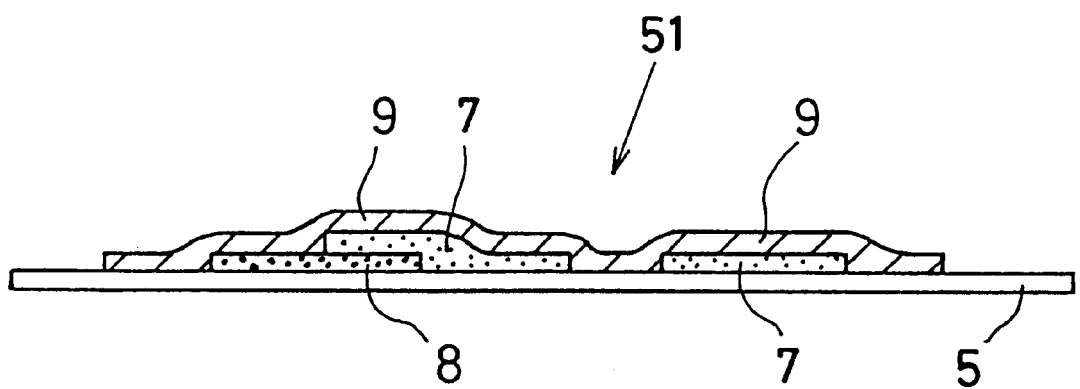
FIG. 4 is a longitudinal cross sectional view of a transfer sheet according to a fourth embodiment of the invention.

FIGS. 3 and 4 show third and fourth embodiment of the invention in which new reference numerals are add to part components other than the part components designated by the respective reference numerals identical to those in FIGS. 1, 2.

A method of transferring the transfer marks 23, 24 is as follows:

(1) In the third embodiment of the invention shown in FIG. 3, the spearable layer 6 is prepared in advance with acrylic material as a main constituent. The separable layer 6 is screen printed on the high quality paper 5 whose surface is smoothed by talc and/or smectite. The paper 5 thus treated is placed in a dry chamber to desiccate it at 130° C. for about 30 minutes so as to provide a transfer sheet 50*a*. The acrylic separable layer 6 is thermoplasticized at a temperature lower than a temperature an adhesive layer 9 does as described hereinafter.

The paper 5 prepared herein has the same dimensions as those used in the second embodiment of the invention in which the area of the separable layer 6 is greater than the combined area of the yellow ribbon 23 and the red colored numeral 24.

(2) On the separable layer 6 of the paper 5, the pigment layers 8, 7 are screen printed to express the red colored numeral 24 and the yellow ribbon 23.

(3) Then, the pigment layers 8, 7 are desiccated at 130° C. for about 30 minutes respectively.

(4) After desiccating the pigment layers 8, 7 on the paper 5, an adhesive layer 9 is prepared from the acrylic material. The adhesive layer 9 has more acrylic ingredient than the separable layer 6. This is becuase the adhesive layer 9 is thermoplasticized at a temperature higher than a temperature the separable layer 6 does. Then, the adhesive layer 9 is screen printed on the pigment layers 7, 8 of the paper 5. These layers 7, 8, 9 are desiccated in the dry chamber at 130° C. for about 30 minutes so as to provide the transfer sheet 50*a*.

In this instance, the transfer sheet 50*a* devoid of the separable layer 6 serves as a transfer sheet 51 according to the fourth embodiment of the invention as shown in FIG. 4.

Figure 10:
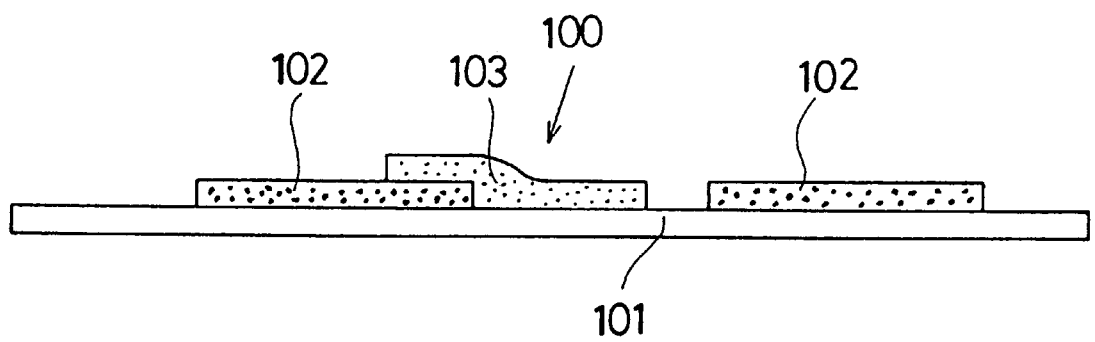
FIGS. 10, 11 are longitudinal cross sectional views of conceptional transfer sheets on which the inventor relies when making the present invention.
Figure 11:
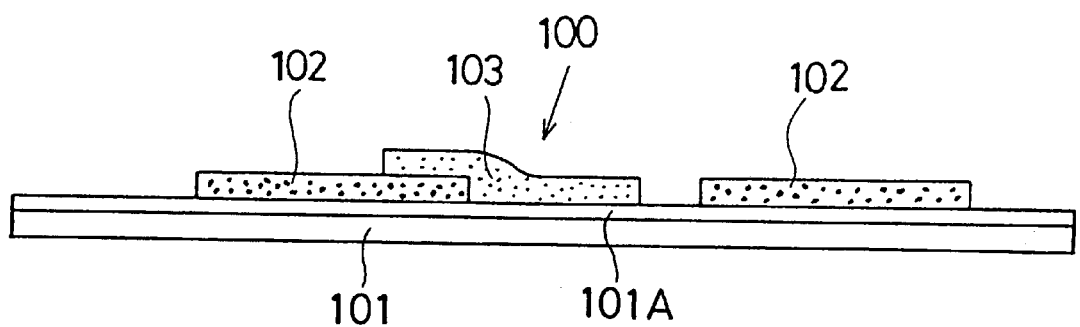

Upon comparing definitiveness of transfer marks as described hereinafter, first and second modification transfer sheets 50, 100 are prepared in which the same denotations are used as those shown in FIGS. 2 and 10 for the sake of analogy. The first modification transfer sheet 50 has the separable layer 6, but not having the adhesive layer 9. The second modification transfer sheet 100 has neither the separable layer 6 nor the adhesive layer 9.

The transfer inks (red, yellow) are prepared by mixing the red and yellow pigment with $PbO$—$SiO_2$ based glass to form the mixture in the same manner as shown at Table 2 of the second embodiment of the invention.

(5) Upon transferring the marks from the transfer sheet 50a or 51, the insulator 2 is heated in the transfer temperature range of approx. 80° C. While revolving the insulator 2 around its central axis, the transfer sheet 50a or 51 is pressed on the outer surface of the insulator 2.

As the case with the transfer sheet 50a, when pressing the transfer sheet 50a on the insulator 2, the insulator 2 gives its heat to the thermoplastic separable layer 6 to soften it, thus significantly reducing the bondage strength between the paper 5 and the separable layer 6. This makes it easier to separate the paper 5 from the separable layer 6 so as to transfer the pigment layers 7, 8 to the outer surface 200 of the insulator 2.

(6) The transfer marks on the insulator 2 are heated to approx. 850° C. for 30 minutes to print them as the yellow ribbon 23 and red colored numeral 24 on the insulator 2 in the same manner as described in the second embodiment of the invention. The insulator 2 is heated such that the separable layer 6 disappeared by evaporation.

It is to be observed that after inserting the center electrode 3 into the axial bore 20 of the insulator 2 on which the transfer marks are printed, the same procedures are repeated to assemble the spark plug as those described at the first embodiment of the invention.

Transferring and printing experimental tests were carried out by producing 100 lots in each of the transfer sheets 50a, 51 and the modification transfer sheets 50, 100. The results are shown at Table 4.

TABLE 4

|  | defections observed in yellow ribbon 23 and red-colored numeral 24 | definitiveness |
| --- | --- | --- |
| transfer sheet 50a | 0/100 | ○○ |
| transfer sheet 51 | 5/100 | ○ |
| transfer sheet 50 | 15/100 | ○○ |
| transfer sheet 100 | 32/100 | ○ |

(*)Note
(○○) represents the yellow ribbon 23 and the red colored numeral 24 with a strong contrast,
(○) represents the yellow ribbon 23 and the red colored numeral 24 somewhat short of definitiveness.

With the use of the transfer sheet 50a, 51 it is possible to acceptably transfer the pigment layers 7, 8 to the outer surface 200 of the insulator 2 without grinding, smoothing and enameling the outer surface 200. This makes it possible to print the yellow ribbon 23 and the red colored numeral 24 on the outer surface 200 of the insulator 2 to an acceptable degree as shown at Table 4.

The reason for these advantages are as follows:

When pressing the transfer sheet 50a on the insulator 2, the heated insulator 2 softens the thermoplastic separable layer 6 at approx. 80° C., thus making it easier to separate the paper 5 from the separably layer 6 to facilitate the transfer of the pigment layers 7, 8. This is all the more true when considering that the adhesive layer 9 adheres tightly to the outer surface 200 of the insulator 2.

With the transfer sheet 51 in which the separable layer 6 not provided, when pressing the transfer sheet 51 on the insulator 2, the heated insulator 2 softens the thermoplastic pigment layers 7, 8, thus significantly reducing the bondage strength between the paper 5 and the pigment layers 7, 8. This makes it easier to separate the paper 5 from the pigment layers 7, 8, thus facilitating their transfer to the insulator 2.

In both the cases, the adhesive layer 9 acts as an reinforcement to positively transfer the pigment layers 7, 8 without defections when the outer surface 200 of the insulator 2 is in rough and undulating condition. Upon printing the transfer marks at the printing temperature, the pigment layers 7, 8 are definitively appear respectively on the outer surface 200 of the insulator 2 as the yellow ribbon 23 and the red colored numeral 24.

Figure 5:
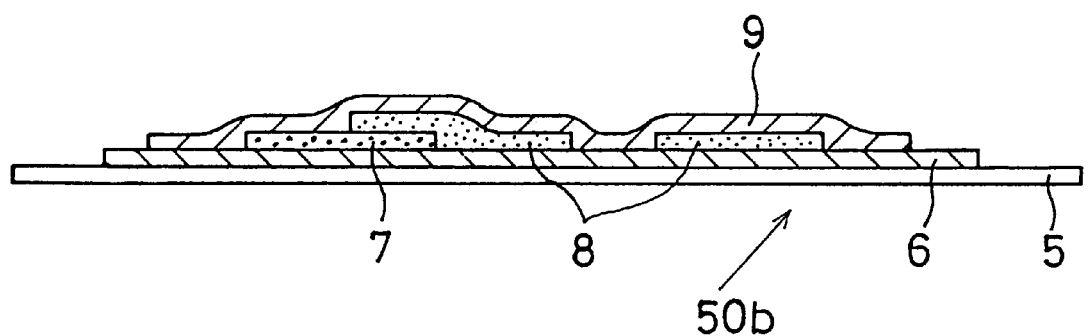
FIG. 5 is a longitudinal cross sectional view of a transfer sheet according to a fifth embodiment of the invention.
Figure 6:
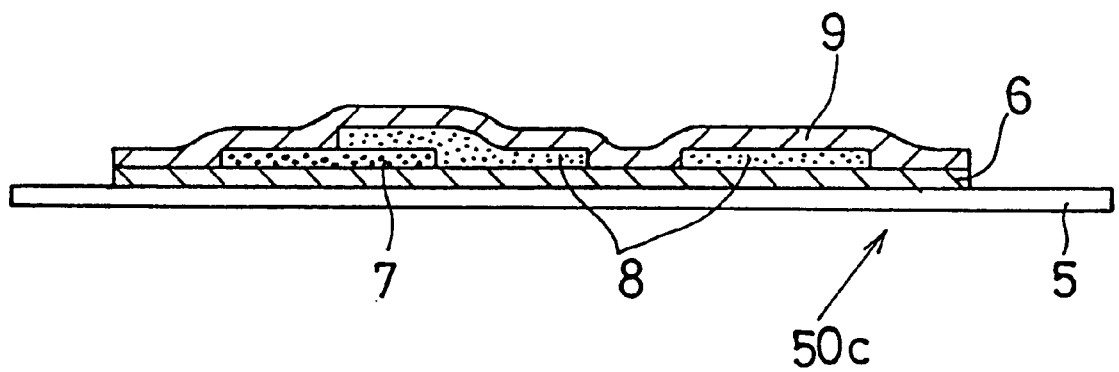
FIG. 6 is a longitudinal cross sectional view of a transfer sheet according to a sixth embodiment of the invention.

FIGS. 5 and 6 show a fifth and sixth embodiment of the invention respectively in which new reference numerals are add to part components other than the part components designated by the respective reference numerals identical to those in FIGS. 1 through 4.

A method of transferring the yellow ribbon 23 and the red colored number 24 is as follows:

(1) In the fifth embodiment of the invention, the separable layer 6 is prepared in advance with acrylic material as a main constituent. The separable layer 6 is screen printed on the high quality paper 5 whose surface is smoothed by talc and/or smectite. The paper 5 thus treated is placed in a dry chamber to desiccate it at 130° C. for about 30 minutes so as to provide a transfer sheet 50b. The acrylic separable layer 6 is thermoplasticized at a temperature lower than the temperature the adhesive layer 9 does as mentioned hereinafter.

The paper 5 prepared herein also has the same dimensions as those described in the second embodiment of the invention in which the area of the separable layer 6 is greater than the total area of the yellow ribbon 23 and the red colored numeral 24.

(2) On the separable layer 6 of the paper 5, the pigment layer 8, 7 are screen printed by the red transfer ink for expressing the red colored numeral 24 and the yellow ribbon 23 as described in the second embodiment of the invention.

(3) Then, the pigment layer 8, 7 on the paper 5 are desiccated at 130° C. for about 30 minutes in the same manner as described in the second embodiment of the invention.

(4) After desiccating the transfer marks on the paper 5, the adhesive layer 9 is screen printed on the paper 5 to provide a transfer sheet 50b. On this occasion, an area of the adhesive layer 9 protrudes out of an area of the pigment layers 7, 8 without protruding out of an area of the separable layer 6 as shown in FIG. 5.

As the sixth embodiment of the invention, the area of the adhesive layer 9 protrudes out of the area of the pigment layers 7, 8, but having the same area of the separable layer 6 to provide a transfer sheet 50c as shown in FIG. 6.

Additionally, the transfer sheet is divided into three categories (i), (ii), (iii) depending on how the adhesive layer 9 is printed on the paper 5 for the purpose of comparison.

(i) First Modification Form

Figure 7:
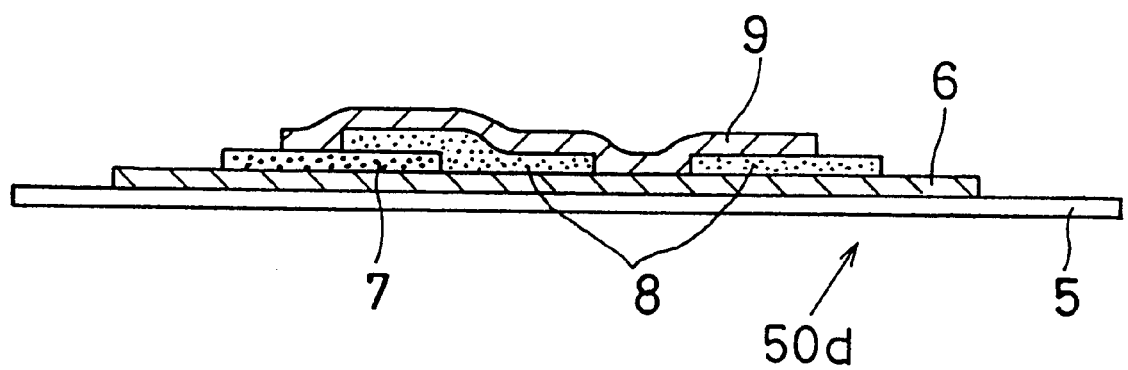
FIG. 7 is a longitudinal cross sectional view of a first modification transfer sheet.

The area of the adhesive layer 9 is defined without protruding out of the areas of the pigment layers 7, 8 and the separable layer 6 to provide a transfer sheet 50d as shown in FIG. 7.

(ii) Second Modification Form

Figure 8:
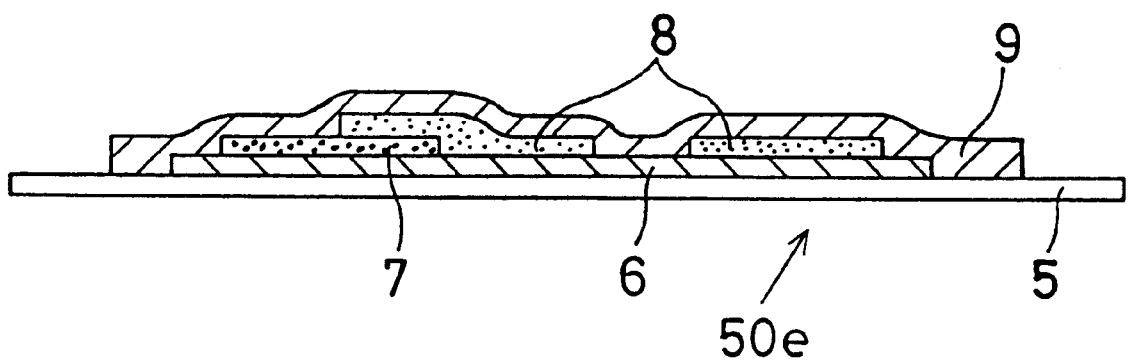
FIG. 8 is a longitudinal cross sectional view of a second modification transfer sheet.

The area of the adhesive layer 9 is defined to protrude out of the areas of the pigment layers 7, 8 and the separable layer 6 respectively to provide a transfer sheet 50e as shown in FIG. 8.

(iii) Third Modification Form

Figure 9:
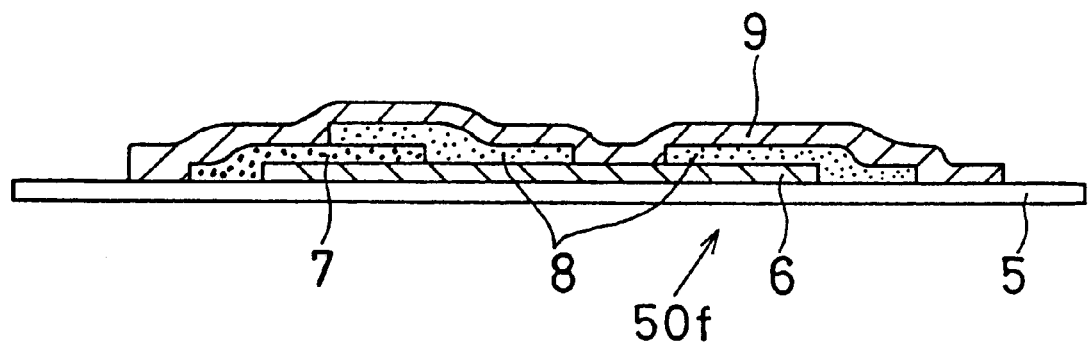
FIG. 9 is a longitudinal cross sectional view of a third modification transfer sheet.

In addition to the category defined at (ii), the areas of the pigment layers 7, 8 are defined to partly protrude out of the area of the separably layer 6 to provide a transfer sheet 50f as shown on FIG. 9.

It is to be noted that the transfer inks (red, yellow) are prepared by mixing red and yellow pigment with PbO—SiO$_2$ based glass to form a mixture in the same manner as described in the second embodiment of the invention.

(5) Upon transferring the marks from the transfer sheet 50b or 50c (50d,50e,50f), the insulator 2 is heated in the transfer temperature (preferably 70–80° C.). While revolving the insulator 2 around its central axis, the transfer sheet 50b or 50c (50d,50e,50f) is pressed on the outer surface 200 of the insulator 2.

(6) The transfer marks on the insulator 2 are heated to approx. 850° C. for 30 minutes to print on them the insulator 2 as the yellow ribbon 23 and red colored numeral 24. At this process, the thermoplastic separable layer 6 is evaporated.

It is to be noted that after inserting the center electrode 3 into the axial bore 20 of the insulator 2 on which the transfer marks are printed, the same procedures are repeated to assemble the spark plug as those described in the first embodiment of the invention.

With the arrangement among the separable layer 6, the adhesive layer 9 and the pigment layers 7, 8 according to the fifth and sixth embodiment of the invention, the relationship is expressed by the formula as an area of the separable layer 6>an area of the adhesive layer>an area of the pigment layers 7, 8, otherwise the area of the separable layer 6>the area of the adhesive layer=the area of the pigment layers 7, 8.

Upon transferring the pigment layers 7, 8, it is possible to positively separate the pigment layers 7, 8 with the adhesive layer 9 from the paper 5 without retaining residues of the pigment layers 7, 8 on the paper 5. With the use of the transfer sheets 50b, 50c, it is possible to definitively print the pigment layers 7, 8 on the outer surface 200 of the insulator 2 without defections.

With the use of the transfer sheet 50d of the first modification form, it is difficult to fully transfer a part of the pigment layers 7, 8 which is not coated with the adhesive layer 9.

With the use of the transfer sheet 50e of the second modification form, there is likelihood that a part of the pigment layers 7, 8 falls off the insulator 2 when separating the paper 5 from the transfer sheet 50e since the adhesive layer 9 coats an outer periphery of the pigment layers 7, 8.

With the use of the transfer sheet 50f of the third modification form, it is difficult to fully transfer a part of the pigment layers 7, 8 which protrudes out of the separable sheet 6 since the pigment layers 7, 8 depositions their outer periphery directly on the paper 5.

Upon pressing the transfer sheet 50b (50c) on the insulator 2, the separable layer 6 softens sooner than the adhesive layer 9 and the pigment layers 7, 8 since the acrylic separable layer 6 thermoplasticizes at a temperature lower than the teperatures the adhesive layer 9 and the pigment layers 7, 8 do respectively. This keeps the pigment layers 7, 8 in in an original good configuration upon transferring them to the insulator 2.

It should be noted that the ceramic product includes not only the spark plug insulator but a semiconductor base plate, rice bowl, tea bowl, dish plate, flower vase, pottery, toilet stool and the like.

It should be also noted that the transfer figuration may be geometric figure, letter, ideogram, symbol, denotation, pattern and the like instead of the ribbon and the numeral.

It should be appreciated that the chromophoric pigment may be represented by not only yellow and red but black, orange, blue, golden, silver, green and various types of colors.

While the invention has been described with reference to the specific embodiment, it is understood that this description is not to be construed in a limitting sense in as much as various modifications and additions to the specific embodiments may be made by skilled artisans without departing the scope of the invention.

What is claimed is:

1. A method of making a spark plug insulator comprising the steps of:

preforming and sintering a ceramic insulator to impart a predetermined configuration;

preparing a transfer sheet by using a sheet paper or plastic film on which a design layer is screen printed which is made by an ink having a mixture of chromophoric pigment, vitreous powder and thermosetting plastic material so as to represent a single or plurality of colorations;

adhering said transfer sheet to said sintered ceramic insulator to transfer said design layer to said sintered ceramic insulator which is heated to a first temperature of 60–150° C. while rotating said sintered ceramic insulator around its axis; and further heating said sintered ceramic insulator to a second temperature of 750–900° C. so as to print said design layer on said sintered ceramic insulator.

2. A method of making a spark plug insulator as recited in claim 1:

said insulator comprising a sintered ceramic insulator; and said transfer sheet comprising a substrate of a paper sheet or a plastic film, a design layer screen printed on a first side of said sheet, said design layer comprising an ink having a mixture of chromophoric pigment, vitreous powder and thermosetting plastic material to represent a single or a plurality of colorations;

wherein said transfer sheet is attachable on said fist side to said sintered ceramic insulator to transfer said design layer to said ceramic insulator while heating said sintered ceramic insulator to a first temperature of 60–150° C., and said design layer is printable on said sintered ceramic insulator when further heated to a second temperature of 750–900° C.

3. A method of making a spark plug insulator as recited in claim 2, wherein said design layer screen is printable on said mount paper and has an ink comprising a mixture of chromophoric pigment, vitreous powder and thermosetting plastic material so as to represent a single or a plurality of colorations, and said design layer is adapted to thennoset at a temperature higher than a temperature said separable layer does.

4. A method of making a spark plug insulator as recited in claim 1, wherein said transfer sheet comprises:

a mount paper;

a single or plurality of design layers laid on said mount paper isolatedly, overlapping each other or alone; and an adhesive layer placed on said design layer to coat thereof.

5. A method of making a spark plug insulator as recited in claim 4, wherein said adhesive layer comprises a thermosetting plastic material; and said design layer screen printed on said mount paper has an ink prepared by mixing chromophoric pigment, vitreous powder and thermosetting plastic material so as to represent a single or a plurality of colorations.

6. A method of making a spark plug insulator as recited in claim 1 wherein said transfer sheet further comprises:

a mount paper;

a separable layer made with a thermosetting plastic material as a main ingredient and formed on said mount paper;

a single or a plurality of design layers made from an ink mixed with chromophoric pigment, vitreous material and thermosetting plastic material so as to represent a single or plurality of colorations:

said design layers being laid on said separable layer isolatedly, overlapping each other or alone without extruding from an area of said separable layer; and an adhesive layer made with a thermosetting plastic material as a main ingredient and placed on said design layer to fully cover said design layer without extruding from the area of said separable layer.

7. A method of making a spark plug insulator as recited in claim 6 wherein said separable layer is adapted to thermoset at a temperature lower than a temperature said design layer and adhesive layer does respectively.

* * * * *